US010344868B2

(12) United States Patent
Jarosinski et al.

(10) Patent No.: US 10,344,868 B2
(45) Date of Patent: Jul. 9, 2019

(54) SEAL ASSEMBLY WITH DETACHABLE SPACER MEMBERS

(71) Applicant: Aktiebolaget SKF, Gothenburg (SE)

(72) Inventors: Ron Jarosinski, South Elgin, IL (US); Mahmoud Zandieh, Wheaton, IL (US)

(73) Assignee: Aktiebolaget SKF, Göteborg (DE)

( * ) Notice: Subject to any disclaimer, the term of this patent is extended or adjusted under 35 U.S.C. 154(b) by 380 days.

(21) Appl. No.: 15/378,275

(22) Filed: Dec. 14, 2016

(65) Prior Publication Data
US 2018/0163873 A1    Jun. 14, 2018

(51) Int. Cl.
| F16J 15/34 | (2006.01) |
| F04D 29/10 | (2006.01) |
| F16J 15/3208 | (2016.01) |
| F16J 15/3256 | (2016.01) |
| F01D 25/24 | (2006.01) |
| F16J 15/3232 | (2016.01) |

(52) U.S. Cl.
CPC ........ F16J 15/3496 (2013.01); F04D 29/102 (2013.01); F16J 15/3208 (2013.01); F16J 15/3256 (2013.01); F01D 25/24 (2013.01); F16J 15/3232 (2013.01)

(58) Field of Classification Search
CPC .... F16J 15/3264; F16J 15/348; F16J 15/3232; F16J 15/3248; F16J 15/3252; F16J 15/3256; F16J 15/3268
See application file for complete search history.

(56) References Cited

U.S. PATENT DOCUMENTS

| 3,561,770 | A | * | 2/1971 | Corsi | F16J 15/164 277/554 |
| 4,415,166 | A | * | 11/1983 | Beia | B62D 1/16 277/551 |
| 5,022,659 | A | * | 6/1991 | Otto | F16C 19/34 277/309 |
| 5,067,732 | A | * | 11/1991 | Szabo | F16J 15/324 277/563 |
| 5,096,207 | A | * | 3/1992 | Seeh | F16J 15/3256 277/353 |
| 5,458,420 | A | * | 10/1995 | Otto | F16C 33/7879 277/317 |

(Continued)

Primary Examiner — Kristina R Fulton
Assistant Examiner — L. Susmitha Koneru
(74) Attorney, Agent, or Firm — Mark Ussai; SKF USA Inc. Patent Dept.

(57) ABSTRACT

A seal assembly includes an annular inner casing disposed on a shaft and including an axial portion and two radial portions. An annular outer casing is disposed about the inner casing and includes an axial portion engageable with the body bore and a radial portion. An annular elastomeric seal member is coupled with the first radial portion of the inner casing and is engageable with the outer casing axial portion. An annular bumper has a fixed end coupled with the outer casing radial portion and a free end disposed adjacent to the inner casing second radial portion. At least one spacer extends from the bumper free end and is disposed against the inner casing second radial portion or within an opening through the inner casing second radial portion. The spacer(s) are detachable from the bumper when one of the inner and outer casings angularly displaces relative to the other casing.

18 Claims, 8 Drawing Sheets

(56) References Cited

U.S. PATENT DOCUMENTS

| | | | | |
|---|---|---|---|---|
| 6,170,834 | B1* | 1/2001 | Vogt | F16J 15/324 |
| | | | | 277/559 |
| 6,450,503 | B1* | 9/2002 | Dossena | F16J 15/3256 |
| | | | | 277/549 |
| 6,497,514 | B2* | 12/2002 | Maldera | B60B 27/00 |
| | | | | 277/353 |
| 8,087,673 | B2* | 1/2012 | Kobayashi | F16C 33/7879 |
| | | | | 277/317 |
| 9,995,396 | B1* | 6/2018 | Maskaliunas | F16J 15/3232 |
| 2004/0227303 | A1* | 11/2004 | Bock | F16J 15/3256 |
| | | | | 277/549 |
| 2008/0128997 | A1* | 6/2008 | Berdichevsky | F16J 15/164 |
| | | | | 277/366 |
| 2012/0313329 | A1* | 12/2012 | Battles | F16J 15/3232 |
| | | | | 277/565 |
| 2015/0267817 | A1* | 9/2015 | Fujii | F16J 15/3268 |
| | | | | 277/572 |
| 2017/0082153 | A1* | 3/2017 | Hess | F16C 33/7809 |

\* cited by examiner

SEAL ASSEMBLY WITH DETACHABLE SPACER MEMBERS

BACKGROUND OF THE INVENTION

The present invention relates to seals, and more particularly to radial lip seals.

Radial lip seals are known and include at least one lip for sealing inwardly against an outer surface of a shaft or sleeve on the shaft, or outwardly against an inner surface of a bore or sleeve/body within the bore. Certain seal assemblies include inner and outer casings such the sealing member is enclosed within the casing and is installed on the shaft and within the bore as a "unitized" seal assembly.

SUMMARY OF THE INVENTION

In one aspect, the present invention is a seal assembly for sealing between a shaft and a body having a bore, one of the shaft and body being rotatable about a central axis extending through the shaft. The seal assembly comprises a generally annular inner casing including an axial portion disposable about the shaft and a radial portion extending generally radially outwardly from the axial portion. A generally annular outer casing is disposable about the inner casing and includes an axial portion engageable with the body bore and a radial portion extending generally radially inwardly from the axial portion. A generally annular elastomeric seal member is coupled with the radial portion of one of the inner and outer casings and is sealingly engageable with the axial portion of the other one of the inner and outer casings. Further, a generally annular bumper has a fixed end coupled with the radial portion of one of the inner and outer casings and an opposing free end disposed at least generally adjacent to the radial portion of the other one of the inner and outer casings. Furthermore, at least one spacer extends from the bumper free end and is disposed generally against the other casing radial portion. The at least one spacer is detachable from the bumper when one of the inner and outer casings angularly displaces relative to the other one of the inner and outer casings.

In another aspect, the present invention is again a seal assembly for sealing between a shaft and a body having a bore, one of the shaft and body being rotatable about a central axis extending through the shaft. The seal assembly comprises a generally annular inner casing including an axial portion disposable about the shaft and having opposing first and second ends, a first radial portion extending generally radially outwardly from the first end of the axial portion and a second radial portion extending generally radially outwardly from the second end of the axial portion. A generally annular outer casing is disposable about the inner casing and includes an axial portion engageable with the body bore and a radial portion extending generally radially inwardly from the axial portion. A generally annular elastomeric seal member is coupled with the first radial portion of the inner casing and is sealingly engageable with the axial portion of the outer casing. Further, a generally annular bumper has a fixed end coupled with the radial portion of the outer casing and an opposing free end disposed at least generally adjacent to the second radial portion of the inner casing. Furthermore, at least one spacer extends from the bumper free end and is disposed generally against the inner casing second radial portion. The at least one spacer is detachable from the bumper when one of the inner and outer casings angularly displaces relative to the other one of the inner and outer casings.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a seal assembly 10 for sealing between a shaft 1 and a body 2 having a bore 3 (see FIG. 5), such as for example a wheel hub, with either the shaft 1 or the body 2 being rotatable about a central axis $A_C$ extending through the shaft 1. The seal assembly 10 has a central axis $A_S$, which is substantially coaxial with the shaft axis $A_C$ when installed, and basically comprises an inner casing 12, an outer casing 14, an elastomeric seal member 16 coupled with one of the inner and outer casings 12, 14, a bumper 18 coupled with one of the two casings 12, 14 and at least one and preferably a plurality of detachable spacers 20 extending from the bumper 18. The inner casing 12 is generally annular and includes an axial portion 22 disposable about the shaft 1 and a radial portion 24 extending generally radially outwardly from the axial portion 22. Preferably, the radial portion 24 is a first radial portion extending generally radially outwardly from a first end 22a of the axial portion 22 and the inner casing 24 further has a second radial portion 26 extending generally radially outwardly from a second end 22b of the axial portion 22. Further, the inner casing axial portion 22 has opposing inner and outer circumferential surfaces 23A, 23B and each casing radial portion 24, 26 has opposing inner and outer radial surfaces 25A, 25B and 27A, 27B, respectively.

The outer casing 14 is disposed about the inner casing 12, is also generally annular and includes an axial portion 28 engageable with the body bore 3 and a radial portion 30 extending generally radially inwardly from the axial portion 28. The outer casing axial portion 28 has opposing inner and outer circumferential surfaces 29A, 29B and the outer casing radial portion 30 has opposing inner and outer radial surfaces 31A, 31B. Furthermore, the elastomeric seal member 16 is generally annular, has an annular lip 17 and is coupled with the radial portion 24, 26 or 30 of one of the inner and outer casings 12, 14, preferably the inner casing first radial portion 24. Also, the seal member 16 is sealingly engageable with the axial portion 22 or 28 of the other one of the inner and outer casings 12, 14, preferably the outer casing axial portion 28.

Still referring to FIGS. 1-8, the bumper 18 is generally annular and extends circumferentially the central axis $A_S$ of the seal assembly 10. The bumper 18 has a fixed end 18a coupled with the radial portion 24, 26 or 30 of one of the inner and outer casings 12, 14 and an opposing free end 18b. Preferably, the bumper fixed end 18a is coupled with the outer casing radial portion 30, and most preferably, an end section 30a of the outer casing radial portion 30 extends generally axially into and reinforces the bumper 18. Further, the bumper free end 18b is disposed at least generally adjacent to the radial portion of the other one of the inner and outer casings 12, 14, preferably the inner casing second radial portion 26, so as to define a generally annular clearance space or gap $G_C$. Thus, the bumper 18 functions generally as a labyrinth seal between the casing radial portions 26 and 30. Preferably, the bumper 18 is formed of an elastomeric material, such as natural or synthetic rubber (e.g., nitrile rubber, fluoro rubber, etc.), or a polymeric material such as polytetrafluoroethylene ("PTFE"), but may be formed of any other appropriate material.

Figure 1:
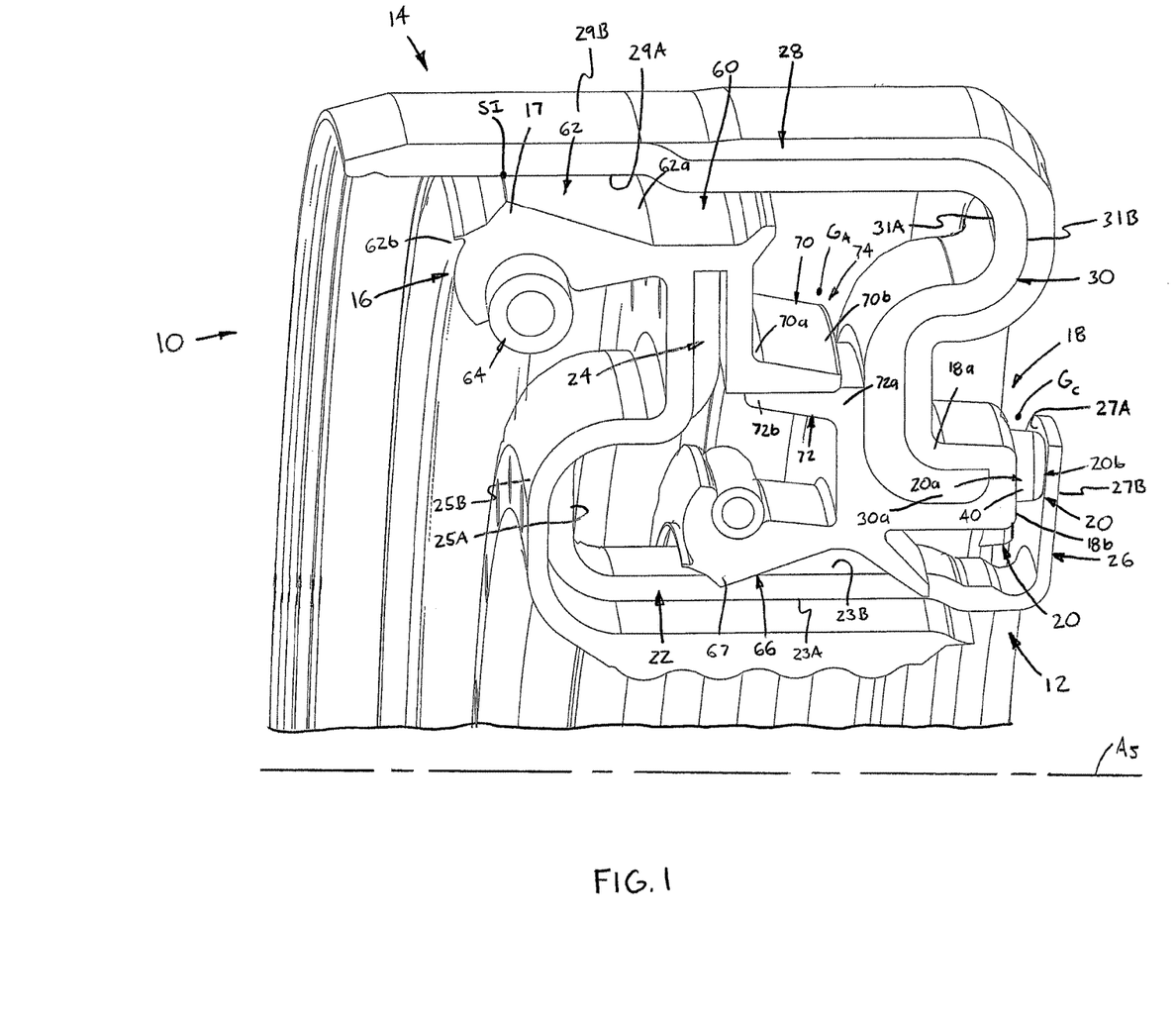
FIG. 1 is broken-away, perspective view in partial axial cross-section of a seal assembly in accordance with the present invention, showing a first construction spacer.
Figure 2:
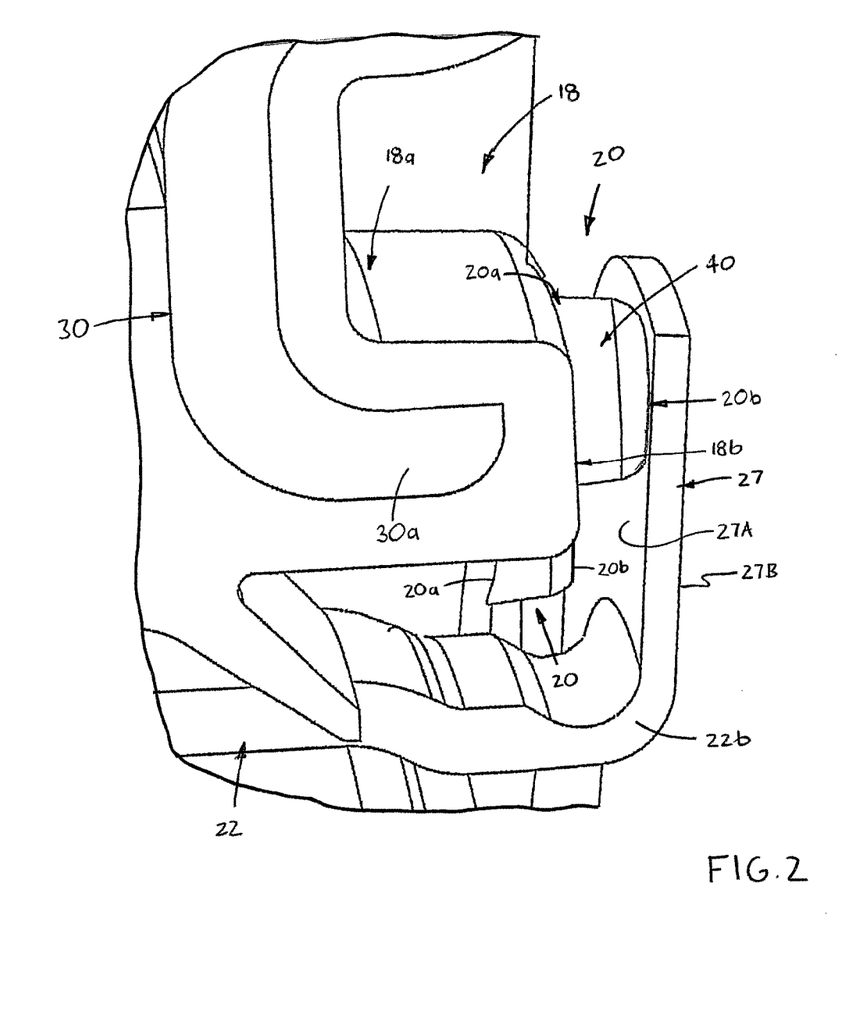
FIG. 2 is a broken-away, enlarged view of a portion of FIG. 1.
Figure 3:
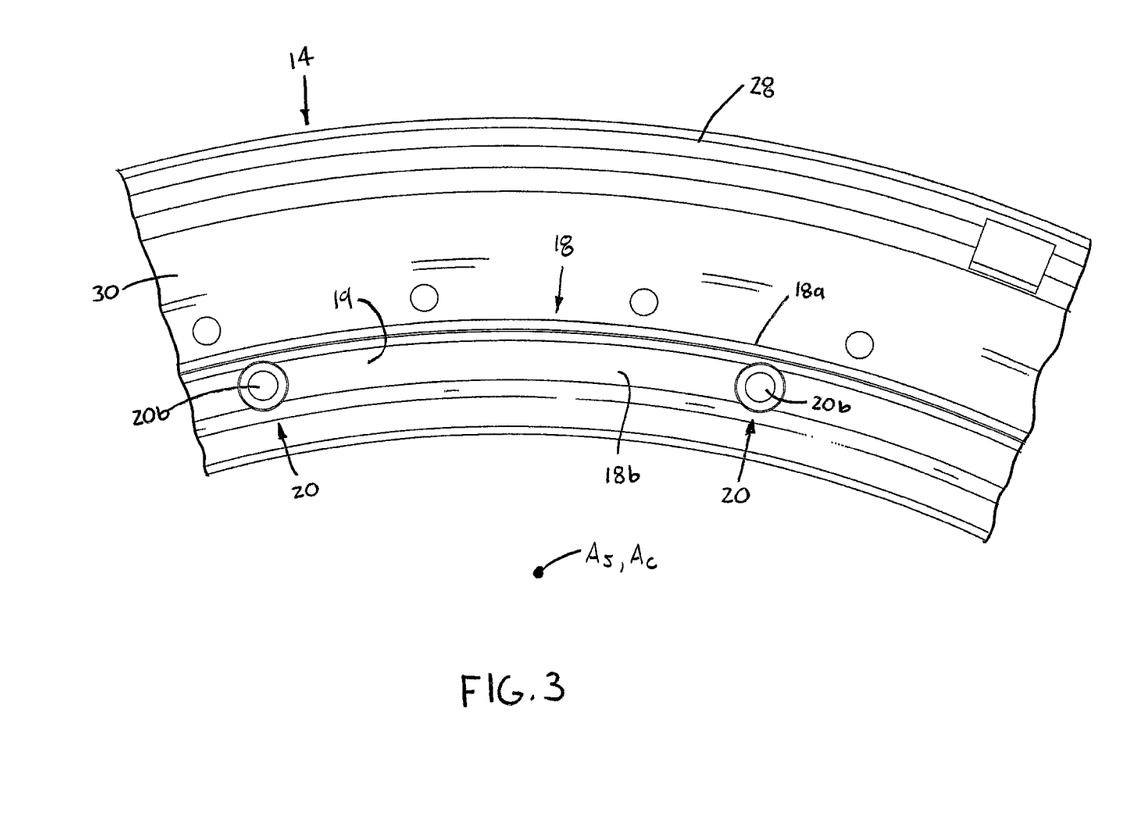
FIG. 3 is a broken-away, side plan view of a portion of an outer casing, showing a bumper and a plurality of first construction spacers extending from the bumper.

Furthermore, each spacer 20 extends from the bumper free end 18b, is disposed generally against the other casing radial portion 26 and is configured to engage with the casing radial portion 26 so as to generally prevent contact between the bumper free end 18b and the radial portion 26. Preferably, the seal assembly 10 includes a plurality of the spacers 20 that each extend axially from a radial end surface 19 of the bumper 18 and are spaced circumferentially about the seal axis $A_S$, as best shown in FIGS. 1-3. Also, the spacer(s) 20 are preferably formed of the same material as the bumper 18, and most preferably are integrally formed with the bumper 18 as discussed below, but may alternatively be formed of a different material and/or connected with the bumper 18 by any appropriate means.

Further, the spacers 20 are each detachable from the bumper 18 when one of the inner and outer casings 12, 14 angularly displaces relative to the other one of the inner and outer casings 14, 12, preferably due to rotation of the body/hub 2 about the shaft 1. Thus, the spacer(s) 20 function to retain the clearance gap $G_C$ between the bumper 18 and the casing radial portion 26 during installation of the seal assembly 10, thereby avoiding bumper-casing contact which would increase friction within the seal assembly 10 during use. Thereafter, the spacers 20 are detached without any external effort during the first use of the seal assembly 10.

Referring to FIGS. 1-4, in one preferred construction, each of the one or more spacers 20 has a first end 20a connected with the bumper free end 18b and an opposing, second free end 20b disposed against the inner radial surface 27A of the casing radial portion 26. Due to the sizing of the spacer 20 and the relative positioning of the bumper 18 and the casing radial portion 26, each spacer 20 is generally compressed between the bumper 18 and the casing portion 26. As such, angular displacement of one of the inner and outer casings 12 or 14 relative to the other one of the inner and outer casings 14, 12 shears each spacer first end 20a from the bumper 18.

Figure 4:
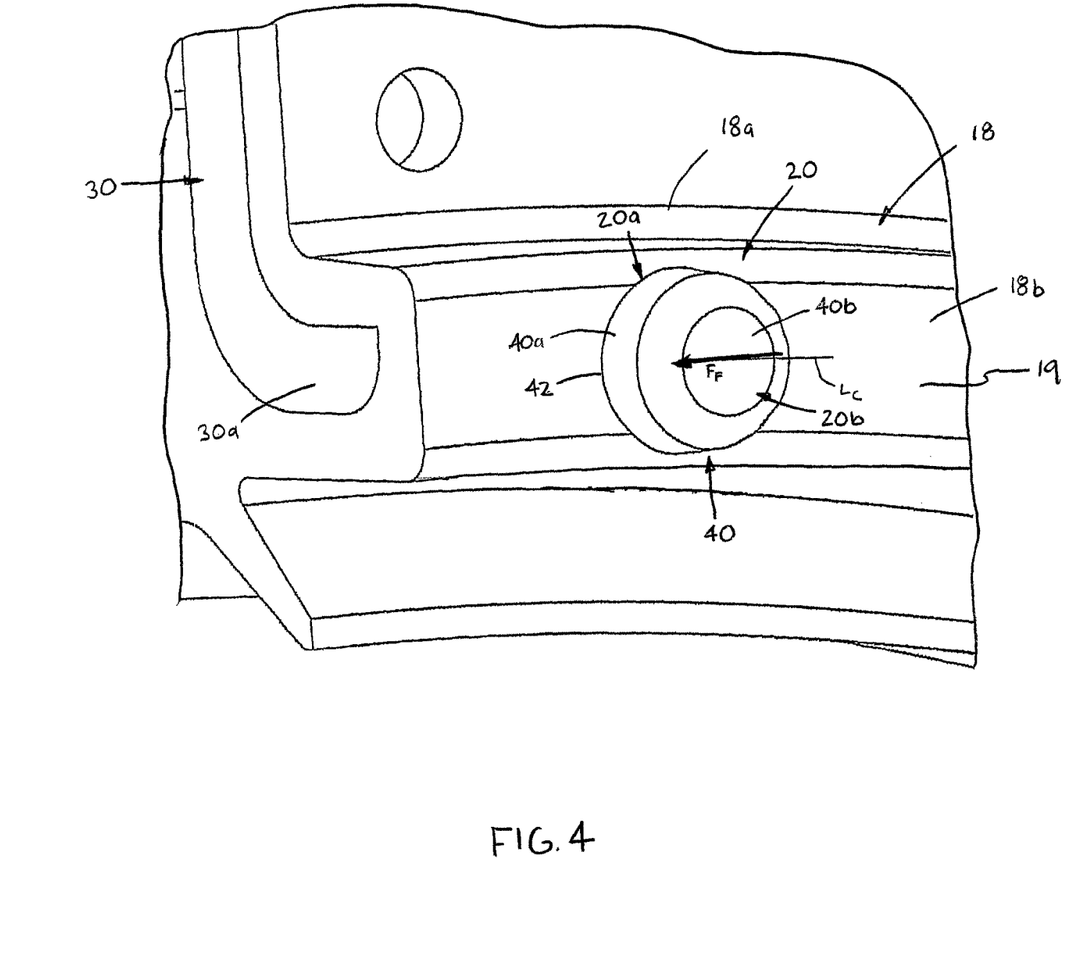
FIG. 4 is a broken-away, perspective view in partial axial-cross-section of the outer casing and bumper with a single first construction spacer.

As best shown in FIG. 4, each first construction spacer 20 preferably includes a generally circular cylindrical body 40 with a first circular base end 40a integrally formed with the bumper free end 18b, a second circular base end 40b providing the spacer free end 20b, and a centerline $L_C$ extending between the base ends 40a, 40b. The first base end 40a forms a circular intersection 42 with the bumper free end 18b, which has a relatively sharp radius (not indicated) between the bumper 18 and the cylindrical body 40. As such, a force $F_F$ applied to the spacer free end 20b (i.e., due to friction between the free end 20b and the casing surface 27A) in a direction generally tangent to the centerline $L_C$ causes shearing of the material of the cylindrical body 40 at the intersection 42, thereby detaching the spacer 20 from the bumper 18. Although a cylindrical body 40 is presently preferred, the spacers 20 that engage with the casing radial surface 27A may have any other appropriate shape, such as a generally rectangular prism, a pyramidal body, a generally wedge-shaped body, etc. (no alternatives shown).

Figure 5:
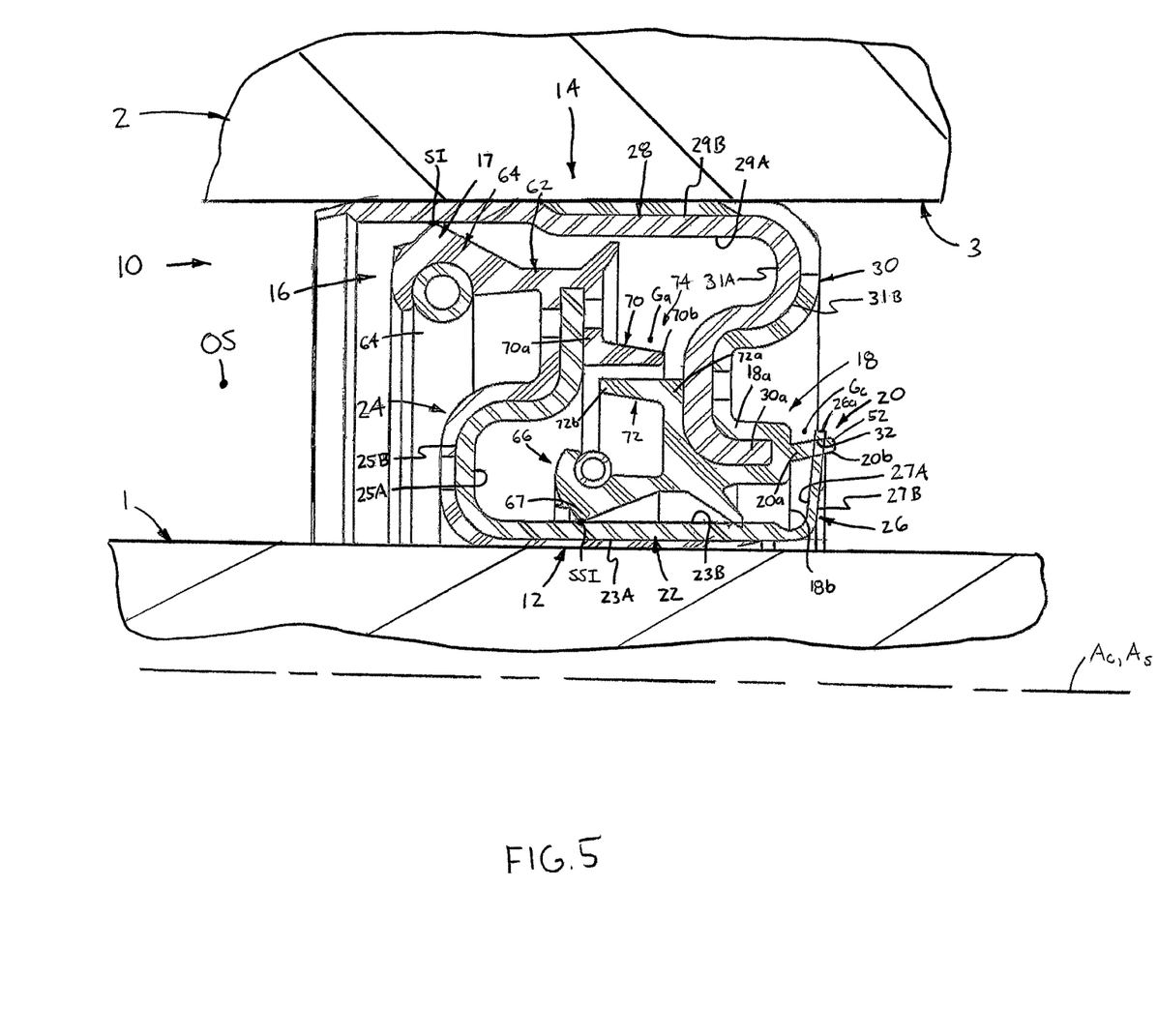
FIG. 5 is a broken-away, axial cross-sectional view of the seal assembly, showing a second construction spacer engaged with a cut-out and the seal assembly mounted on a shaft and within a body bore.
Figure 6:
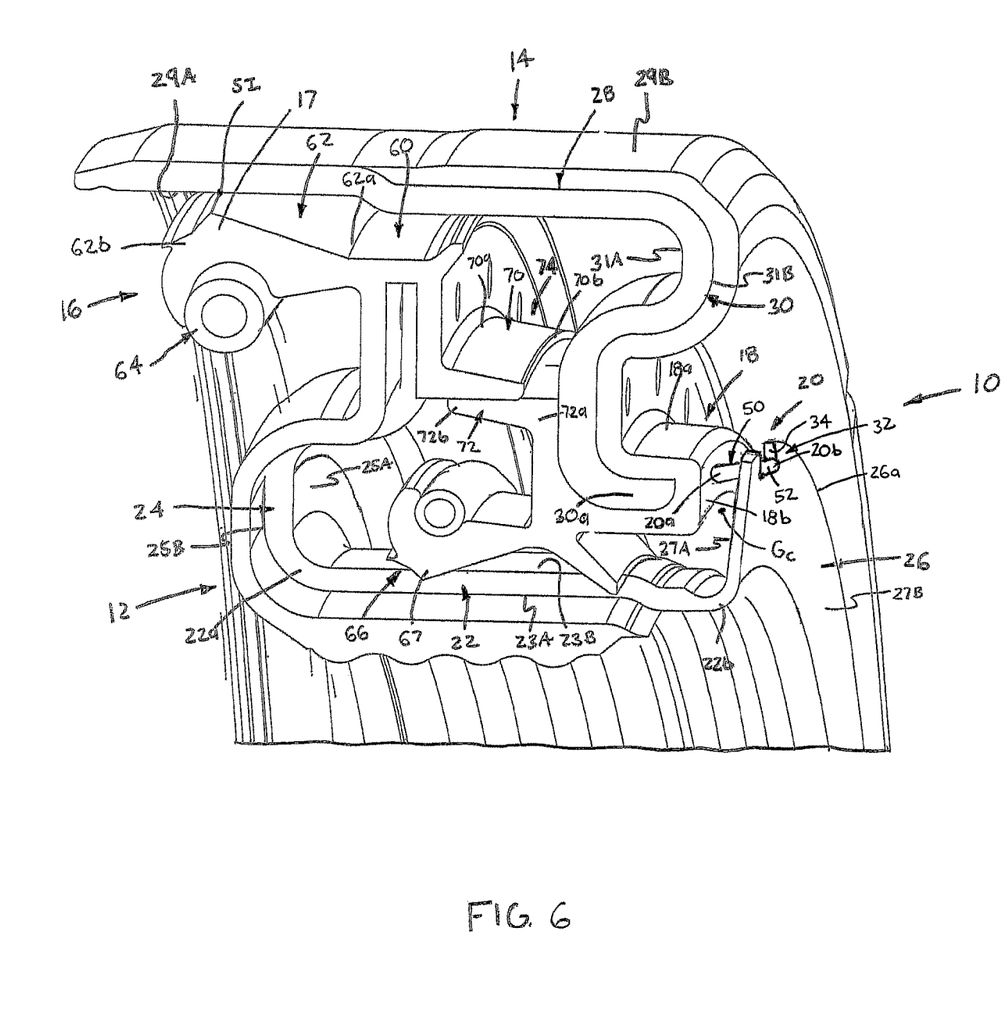
FIG. 6 is a broken-away, perspective view in partial axial cross-section of the seal assembly with second construction spacers.
Figure 7:
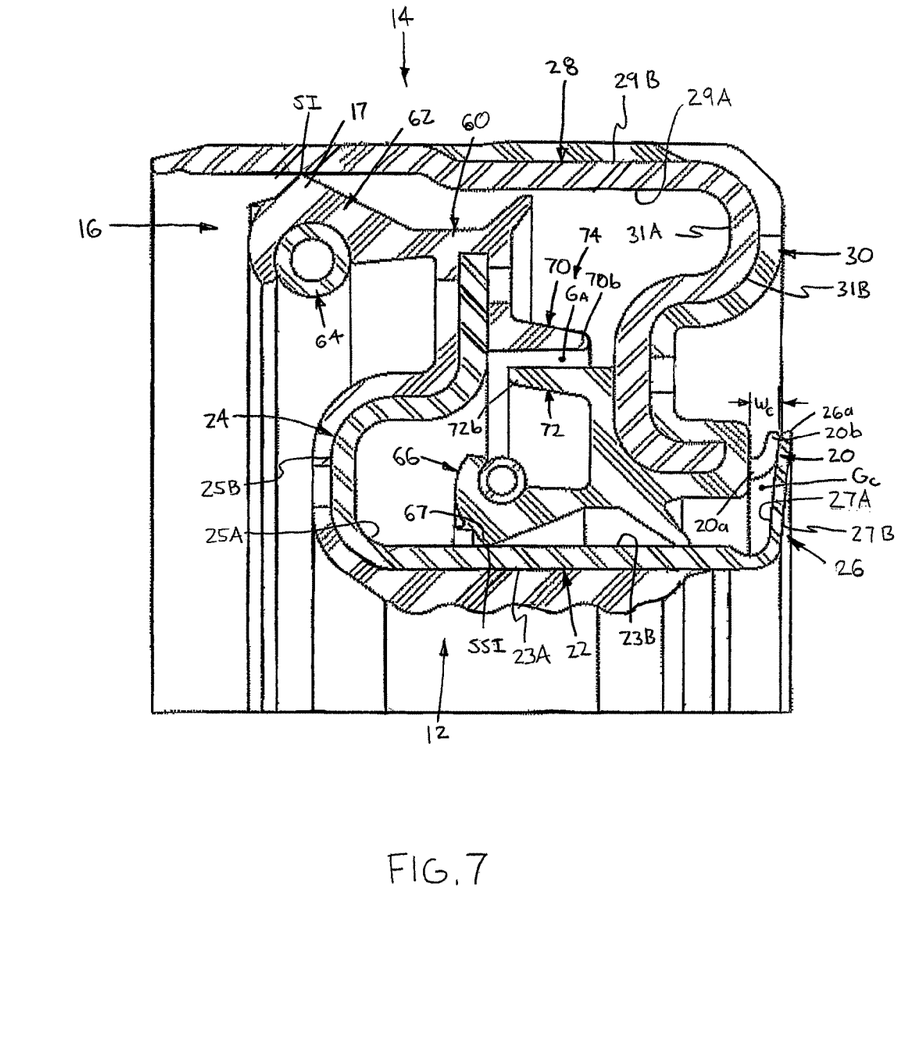
FIG. 7 is a broken-away, axial cross-sectional view of the seal assembly, showing a second construction spacer engaged with a casing radial portion.
Figure 8:
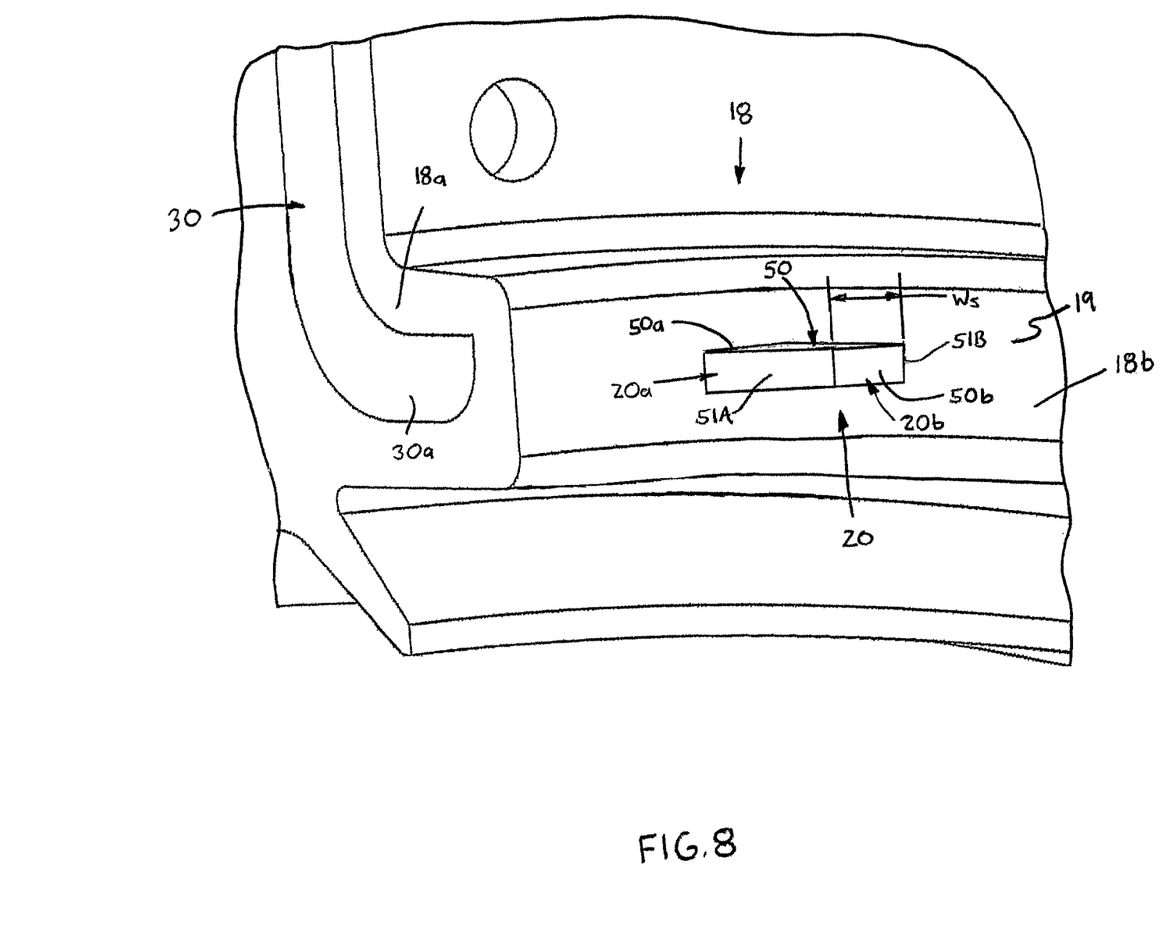
FIG. 8 is a broken-away, perspective view in partial axial-cross-section of the outer casing and bumper with a single second construction spacer.

Referring now to FIGS. 5-8, in another preferred construction, each of the one or more spacers 20 is formed as a relatively thin, cylindrical body 50 having a first end 50a integrally formed with the bumper free end 18b, an opposing free end 50b and a length L (FIG. 8) between the two ends 50a, 50b. The projection length L is slightly greater than the width we of the clearance gap $G_C$ such that each cylindrical body 50 is bended against the radial portion inner surface 27A, as depicted in FIG. 7, and prevents axial displacement of the bumper 18 toward the casing radial portion 26. Further, the casing radial portion 26 has at least one and preferably two generally rectangular cut-outs 32 extending inwardly from an outer edge 26a of the radial portion 26, each cut-out having at least one edge 34.

During the initial use of the seal assembly 10, the relative angular displacement of the casing radial portion 26 and the bumper 18 causes each cylindrical projection 50 to sequentially unbend and project into one of the cut-outs 32, as shown in FIGS. 1 and 2. Then, an edge 34 of the cut-out 32 shears off an end portion 52 of the spacer 20 as the one of the inner and outer casings 12 or 14 continues to angularly displace relative to the other casing 14, 12. Preferably, the cylindrical body 50 is generally circular cylindrical, but may have any other appropriate shape, such as a generally rectangular prism, a pyramidal body, a rectangular or other polygonal cylindrical body, etc. (none shown), and the cut-out(s) 32 may be also be alternatively sized and shaped, e.g., generally circular, to ensure shearing of at least a portion of each spacer 20.

Referring now to FIGS. 1, 5 and 6, the lip 17 of the seal member 16 preferably engages with the inner circumferential surface 29A of the outer casing axial portion 28 so as to define a seal interface SI. Preferably, the seal lip 17 is configured to displace or "pump" fluid within the sealing interface SI generally axially out of the interface SI, preferably to an oil side OS (FIG. 5) of the seal assembly 10. Most preferably, the seal lip 17 is formed so as to extend generally sinusoidally about the seal central axis $A_S$, but may instead have projections or recesses to direct fluids axially or even be formed as conventional lip seal. Further, the seal member 16 preferably includes a base portion 60 coupled with the first radial portion 24 of the inner casing 12 and a cantilever portion 62 having a first end 62a integrally connected with the base portion 60 and an opposing, free end 62b providing the seal lip 17. Furthermore, the seal assembly 10 preferably further comprises a generally annular biasing member 64, preferably a garter spring, disposed within the cantilever portion 62 of seal member 16 and configured to bias the cantilever portion free end 62b generally radially outwardly to maintain contact between the seal lip 17 and the inner circumferential surface 29A of the axial portion 28 of the outer casing 14.

Preferably, the seal assembly further comprises a second elastomeric sealing member 66 coupled with the outer casing radial portion 30 and having a generally annular seal lip 67 engageable with the outer circumferential surface 23B of the inner casing axial portion 22 so as to provide a secondary sealing interface SSI. However, the seal assembly 10 may instead include only a single seal member 16 configured as described above, alternatively coupled with the outer casing axial portion 30 and sealingly engageable with the inner casing axial portion 22, or/and have seal member(s) 16/66 each configured as a standard lip seal without an axial pumping feature.

Still referring to FIGS. 1, 5 and 6, the seal assembly 10 preferably also further comprises first and second cantilever members 70, 72 for providing a labyrinth seal 74 in an axial gap $G_A$ between the inner casing first radial portion 24 and the outer casing radial portion 30. The first cantilever member 70 has a first end 70a connected with the inner casing first radial portion 24 and a second, free end 72b spaced axially from the first end 70a and located generally adjacent to the outer casing radial portion 30. The second cantilever member 72 has a first end 72a connected with the outer casing radial portion 30 and a second, free end 72b spaced axially from the first end 72a and located generally adjacent to the inner casing radial portion 24. Further, the second cantilever member 72 is spaced radially inwardly from the first cantilever member 70 such that the first and second cantilever members 70, 72 form the labyrinth seal 74. However, the seal assembly 10 may alternatively be formed without any such labyrinth seal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal assembly for sealing between a shaft and a body having a bore, one of the shaft and body being rotatable about a central axis extending through the shaft, the seal assembly comprising:
    a generally annular inner casing including an axial portion disposable about the shaft and a radial portion extending generally radially outwardly from the axial portion;
    a generally annular outer casing disposed about the inner casing and including an axial portion engageable with the body bore and a radial portion extending generally radially inwardly from the axial portion;
    a generally annular elastomeric seal member coupled with the radial portion of one of the inner and outer casings and sealingly engageable with the axial portion of the other one of the inner and outer casings;
    a generally annular bumper having a fixed end coupled with the radial portion of one of the inner and outer casings and an opposing free end disposed at least generally adjacent to the radial portion of the other one of the inner and outer casings; and
    at least one spacer extending from the bumper free end and disposed generally against the other casing radial portion, the at least one spacer being detachable from the bumper when one of the inner and outer casings angularly displaces relative to the other one of the inner and outer casings.

2. The seal assembly as recited in claim 1 wherein the bumper free end is spaced from the radial portion of the other one of the inner and outer casings so as to define a generally annular gap and the at least one spacer is configured to engage with the casing radial portion so as to generally prevent contact between the bumper free end and the radial portion.

3. The seal assembly as recited in claim 2 wherein the radial portion of the other one of the inner and outer casings has opposing inner and outer radial surfaces and the at least one spacer has a first end connected with the bumper and an opposing, second free end disposed against the inner radial surface, the spacer being generally compressed between the bumper and the casing radial portion such that angular displacement of one of the inner and outer casings relative to the other one of the inner and outer casings shears the spacer first end from the bumper.

4. The seal assembly as recited in claim 2 wherein the at least one spacer has a first end connected with the bumper, an opposing, second free end disposed against the casing radial portion opening so as to prevent axial displacement of the bumper toward the casing radial portion, the spacer having a length greater than a width of the annular gap such that the spacer is generally bended, the casing radial portion having at least one cut-out with an edge, the spacer unbending and projecting into the at least one cut-out when one of the inner and outer casings angularly displaces relative to the other one of the inner and outer casings such that the edge of the opening shears off an end portion of the spacer.

5. The seal assembly as recited in claim 1 wherein the bumper extends circumferentially about the central axis and the at least one spacer includes a plurality of spacers each extending axially from the bumper and spaced circumferentially about the axis.

6. The seal assembly as recited in claim 1 wherein:
    the seal member is coupled with a first radial portion of the inner casing and is sealingly engageable with an inner surface of the outer casing axial portion; and the bumper fixed end is coupled with the radial portion of the outer casing and the bumper free end is spaced from a second radial portion of the inner casing so as to form an annular gap.

7. A seal assembly for sealing between a shaft and a body having a bore, one of the shaft and body being rotatable about a central axis extending through the shaft, the seal assembly comprising:
   a generally annular inner casing including an axial portion disposable about the shaft and having opposing first and second ends, a first radial portion extending generally radially outwardly from the first end of the axial portion and a second radial portion extending generally radially outwardly from the second end of the axial portion;
   a generally annular outer casing disposed about the inner casing and including an axial portion engageable with the body bore and a radial portion extending generally radially inwardly from the axial portion;
   a generally annular elastomeric seal member coupled with the first radial portion of the inner casing and sealingly engageable with the axial portion of the outer casing;
   a generally annular bumper having a fixed end coupled with the radial portion of the outer casing and an opposing free end disposed at least generally adjacent to the second radial portion of the inner casing; and
   at least one spacer extending from the bumper free end and disposed generally against the inner casing second radial portion, the at least one spacer being detachable from the bumper when one of the inner and outer casings angularly displaces relative to the other one of the inner and outer casings.

8. The seal assembly as recited in claim 7 wherein the bumper free end is spaced from the radial portion of the inner casing so as to define a generally annular gap and the at least one spacer is configured to engage with the inner casing radial portion so as to generally prevent contact between the bumper free end and the radial portion.

9. The seal assembly as recited in claim 8 wherein the second radial portion of the inner casing has opposing inner and outer radial surfaces and the at least one spacer has a first end connected with the bumper and an opposing, second free end disposed against the inner radial surface, the spacer being generally compressed between the bumper and the casing radial portion such that angular displacement of one of the inner and outer casings relative to the other one of the inner and outer casings shears the spacer first end from the bumper.

10. The seal assembly as recited in claim 9 wherein the at least one spacer has a generally circular cylindrical body with a first circular base end integrally formed with the bumper free end, a second circular base end providing the spacer free end, and a centerline extending between the base ends, the first base end forming a circular intersection with the bumper free end, the intersection having relatively sharp radius between the bumper and cylinder body such that a force applied to the spacer free end in a direction generally tangent to the centerline causes shearing of the cylindrical body at the intersection.

11. The seal assembly as recited in claim 9 wherein the at least one spacer has a first end connected with the bumper, an opposing, second free end disposed against the casing radial portion opening so as to prevent axial displacement of the bumper toward the casing radial portion, the spacer having a length greater than the annular gap such that the spacer is generally bended, the casing radial portion having at least one cut-out with an edge, the spacer unbending and projecting into the at least one cut-out when one of the inner and outer casings angularly displaces relative to the other one of the inner and outer casings such that the edge of the opening shears off an end portion of the spacer.

12. The seal assembly as recited in claim 11 wherein the at least one spacer has a generally circular cylindrical body with a first end integrally formed with the bumper free end and a second generally free end.

13. The seal assembly as recited in claim 7 wherein the bumper extends circumferentially about the central axis and the at least one spacer includes a plurality of spacers each extending axially from the bumper and spaced circumferentially about the axis.

14. The seal assembly as recited in claim 7 wherein the seal member has a lip engaged with an inner circumferential surface of the outer casing axial portion so as to define a seal interface and the seal lip configured to displace fluid within the sealing interface generally axially out of the interface.

15. The seal assembly as recited in claim 7 wherein the seal member includes a base portion coupleable with the first radial portion of the inner casing and a cantilever portion having a first end integrally connected with the base portion and an opposing, free end providing a seal lip.

16. The seal assembly as recited in claim 15 further comprising a generally annular biasing member disposed within the cantilever portion of the biasing member and configured to bias the cantilever portion free end generally radially outwardly to maintain contact between the seal lip and the inner circumferential surface of the bore or member.

17. The seal assembly as recited in claim 7 further comprising a second elastomeric sealing member coupled with the outer casing radial portion and having a generally annular seal lip engageable with an outer circumferential surface of the inner casing axial portion so as to provide a secondary seal.

18. The seal assembly as recited in claim 7 further comprising:
   a first cantilever member having a first end connected with the inner casing radial portion and a second, free end spaced axially from the first end and located generally adjacent to the outer casing radial portion; and
   a second cantilever member having a first end connected with the outer casing radial portion and a second, free end spaced axially from the first end and located generally adjacent to the inner casing radial portion and spaced radially from the first cantilever member such that the first and second cantilever members form a labyrinth seal within an axial gap between the inner casing first radial portion and the outer casing radial portion.

* * * * *